Jan. 17, 1928.

L. J. LEON

PARROT CAGE

Filed March 10, 1927      5 Sheets-Sheet 1

1,656,282

Inventor
L. J. Leon,

Jan. 17, 1928.
L. J. LEON
1,656,282
PARROT CAGE
Filed March 10, 1927   5 Sheets-Sheet 2
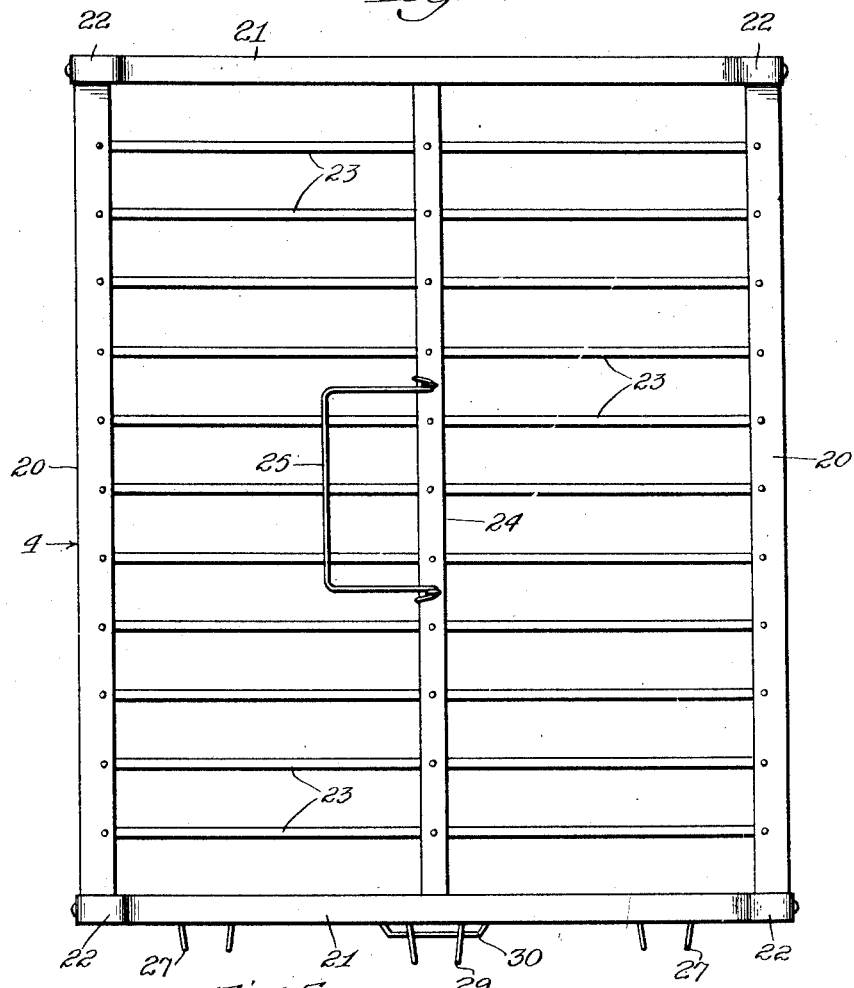
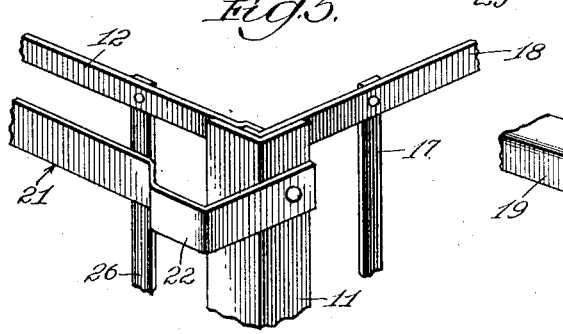
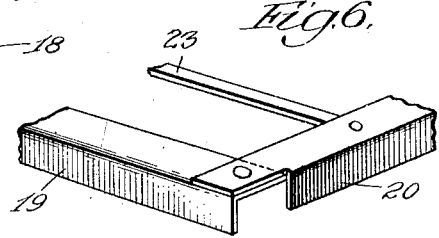
Inventor:
L. J. Leon,
By Augene Ewan
Atty.

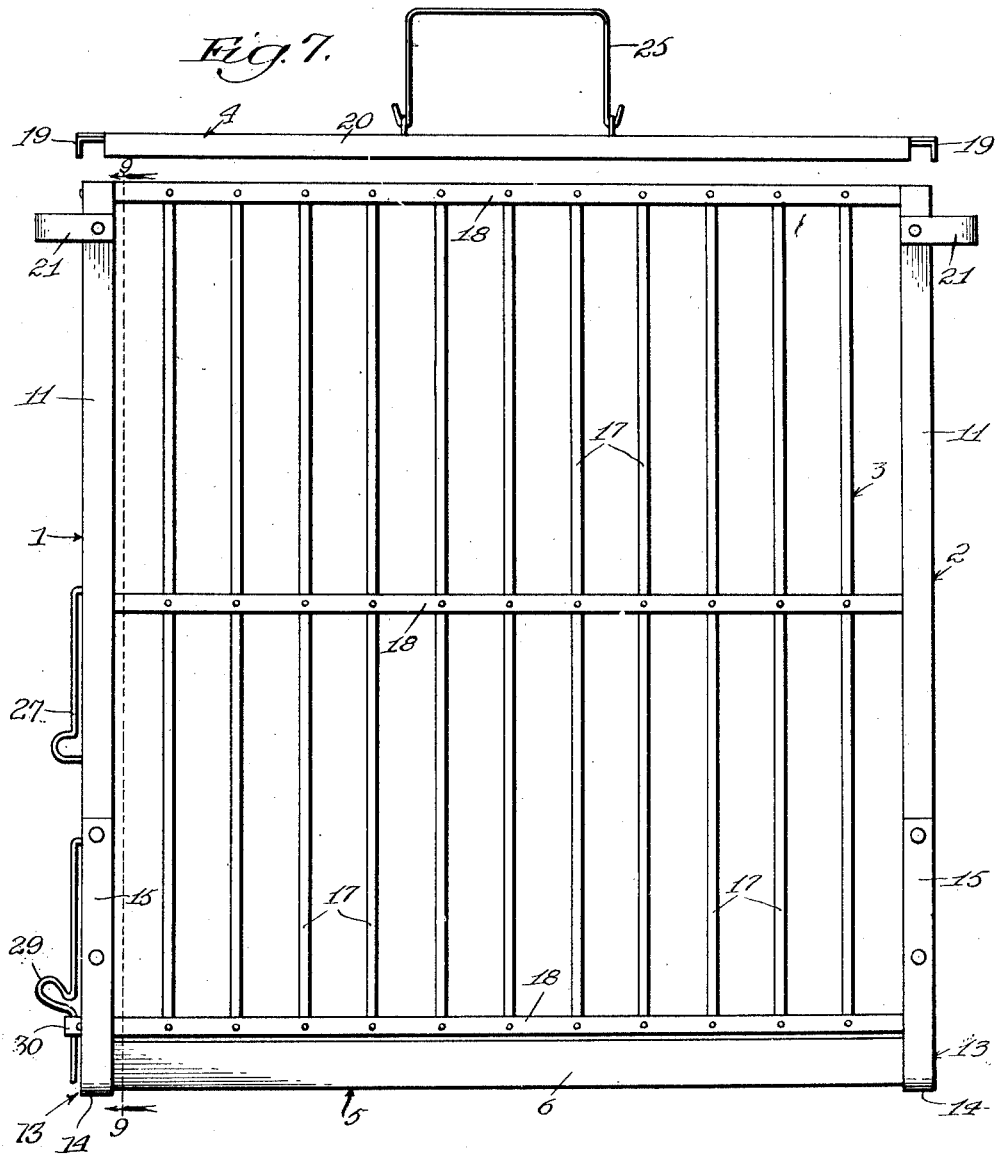

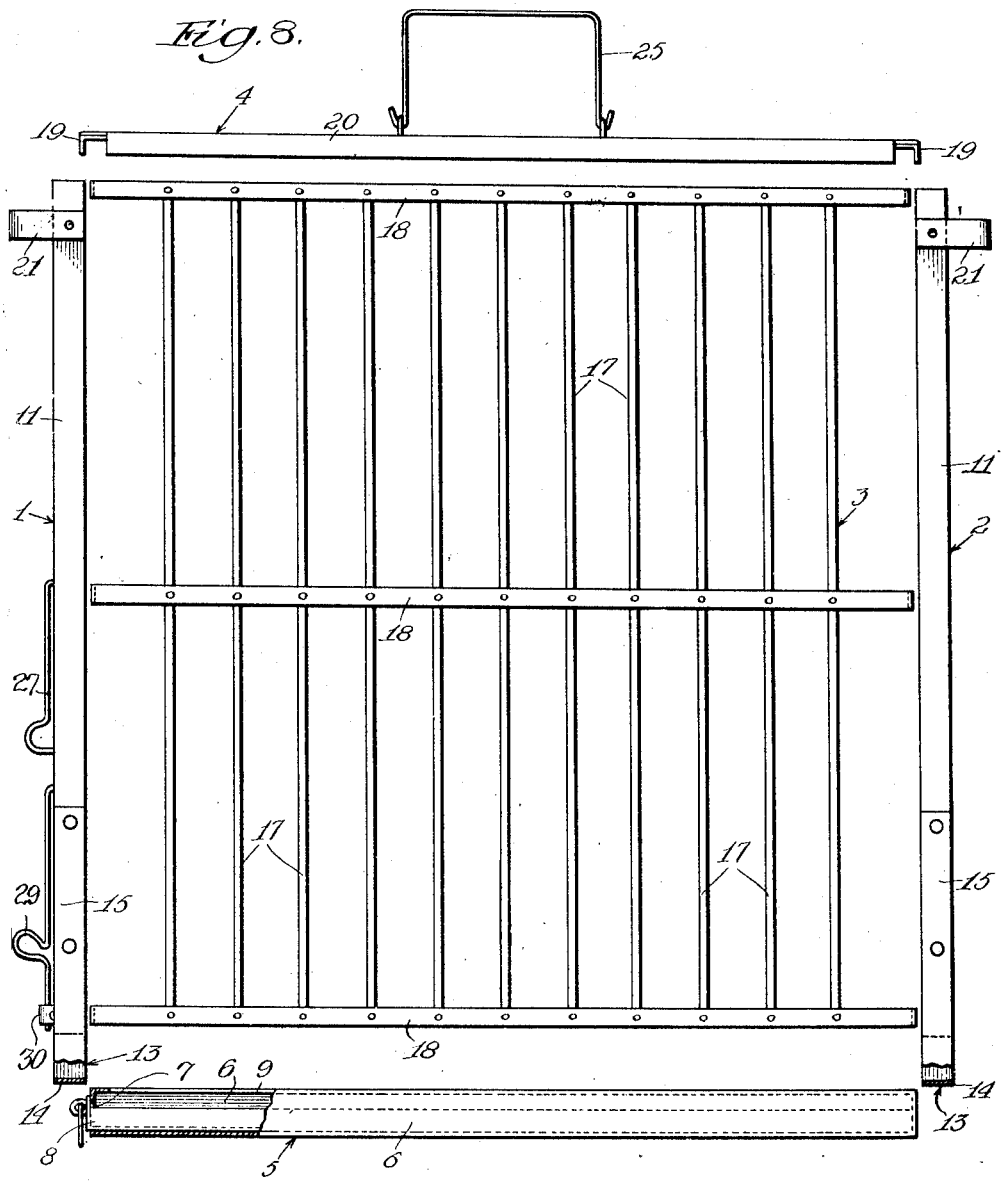

Jan. 17, 1928.

L. J. LEON 1,656,282

PARROT CAGE

Filed March 10, 1927 5 Sheets-Sheet 5

Inventor:
L. J. Leon,

Patented Jan. 17, 1928.

1,656,282

UNITED STATES PATENT OFFICE.

LEWICKI J. LEON, OF WEST CHICAGO, ILLINOIS.

PARROT CAGE.

Application filed March 10, 1927. Serial No. 174,112.

This invention relates to bird cages and more particularly cages to be used for housing parrots while on sale in a store.

The main object of my invention is to provide a cage of this character which is sturdy and strong in construction and which may be shipped from the manufacturer to the user or between bird handlers in collapsed or knocked down form and thus save expense in shipping and packing, as smaller containers than those required for set up cages may be used.

A further object of my invention is to provide a collapsible cage structure in which all of the interlocking parts are permanently carried by the cage sections so that the latter may be readily and easily engaged as the cage is set up without the use of tools or additional loose parts which may become lost or misplaced.

Another object of my invention is to have the base of the cage space and support certain of its upright walls so that the other walls of the cage may be readily engaged with the supported walls and provide a sturdy and strong construction.

The invention consists further in the matters hereinafter described and claimed.

In the accompanying drawings—

Fig. 4 is a top plan view of the cage with the top wall and top clamps in place;

Figs. 5 and 6 are perspective views of a corner of the cage body and top wall, respectively;

Fig. 7 is a side view of the cage and showing the top wall slightly raised for illustrative purposes;

Fig. 8 is a side view showing the front, rear, and side walls and base of the cage disconnected, to show the collapsibility of the cage;

Figure 1:
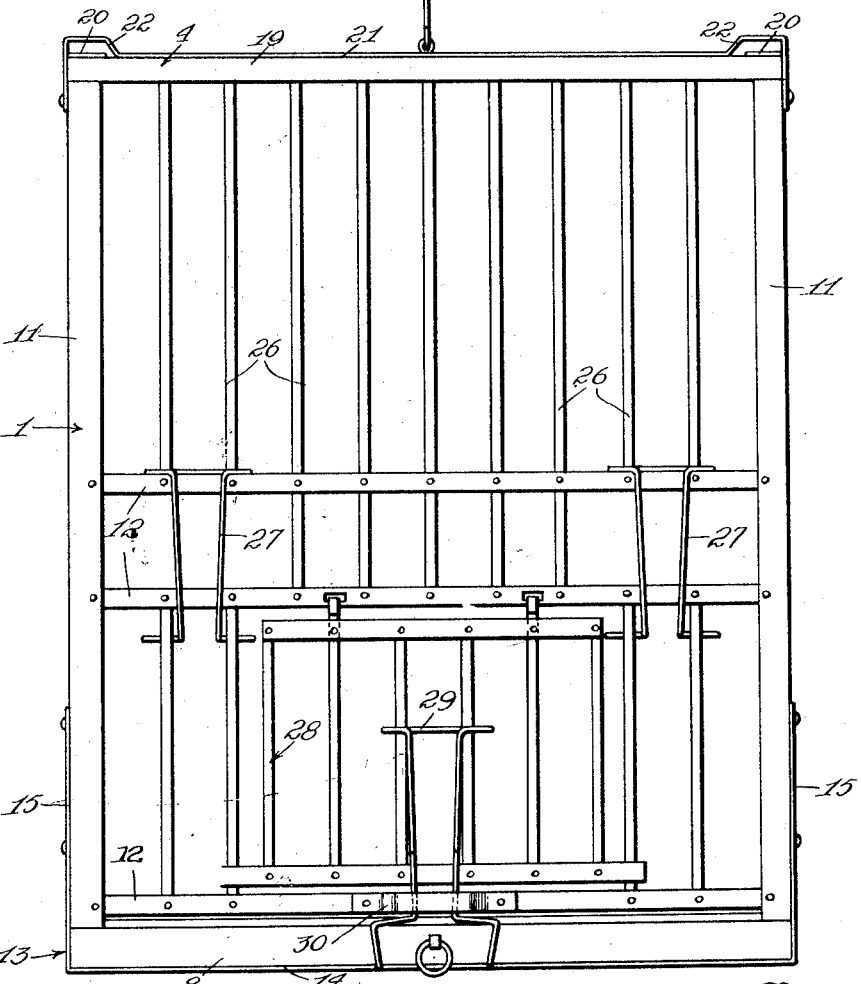
Fig. 1 is a front view of my improved cage set up for use.

As shown in the drawings, the cage is generally box-like in shape and has upright marginal walls 1, 2 and 3, 3, a flat top wall 4, and a flat base 5, all releasably connected together and to the base, respectively, so that the cage may be collapsed into knocked down form for convenience in shipping from manufacturer to user as well as between handlers of birds, such as parrots, for which the cage is particularly designed. The cage is intended to be used solely for housing a parrot while on sale in a store, and not as a permanent cage; the larger and more ornamental and finished cages being used for that purpose.

The base 5 is preferably rectangular in shape and like a tray, being made of sheet metal and having upright marginal walls 6, 6 about the same with an elongated slot 7 at the front so that a drawer 8 may be slid into and out of the same. (See Fig. 10.) The front wall of the drawer engages the portion of the front wall of the base above the slot so to close the same when the drawer is closed, as detailed in Fig. 10. The marginal walls of the base 5 are turned inward along their upper edges to provide horizontal flanges 9, 9 to support a grill 10, which prevents the bird confined in the cage from getting down into the drawer 8 to scatter seed or refuse out of the cage. The drawer being completely removable from the base through the slot 7, the cage may be kept clean and sanitary.

Figure 9:
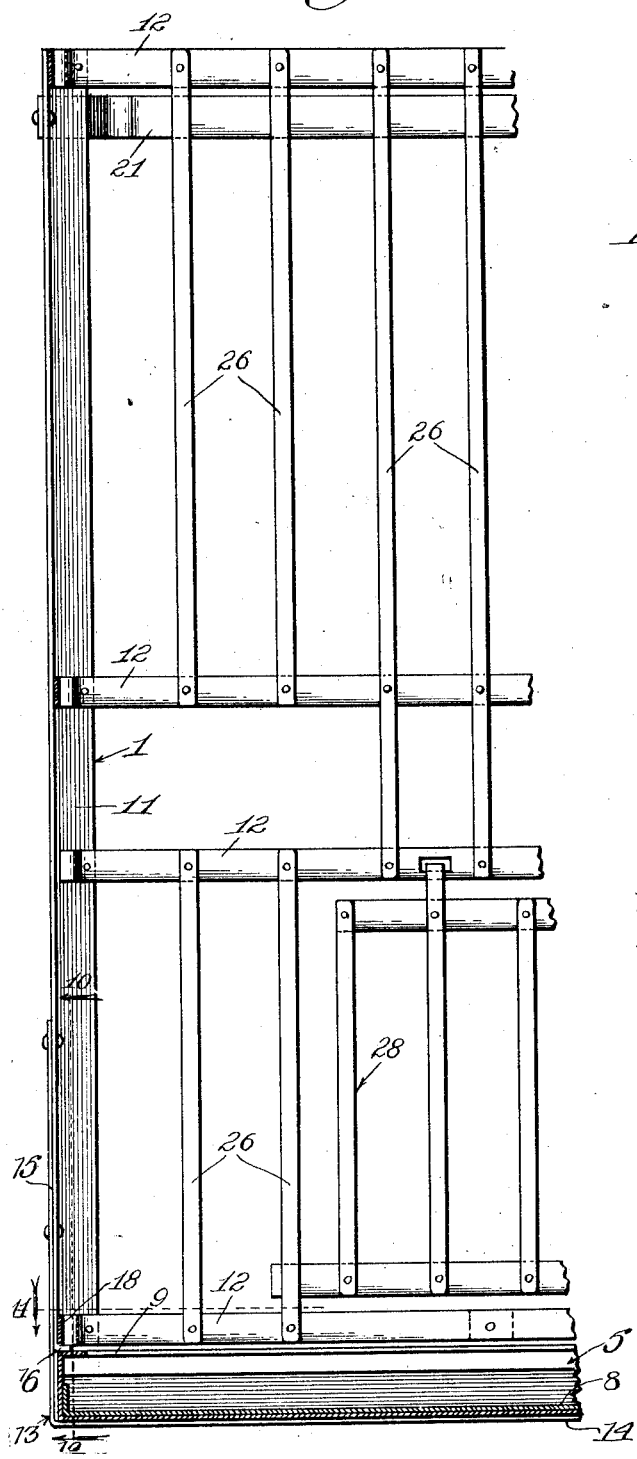
Fig. 9 is an enlarged vertical sectional view taken on line 9—9 of Fig. 7 after the parts are assembled.

Of the upright marginal walls of the cage, the ones 1 and 2 are the front and rear walls of the cage. Each of these walls has vertically disposed side members 11, 11, preferably of sheet metal and angle-shape in cross-section so as to be rigid and strong. (See Figs. 5 and 11.) These side members, in each wall, are connected together between and at their upper and lower ends by crossmembers 12, 12, as shown in Figs. 1 and 9. Rigidly secured to and extending below the side members 11, 11 of each wall in the plane thereof is a stirrup 13 shaped to fit under the bottom of the base 5 for releasably connecting the wall thereto.

Figure 10:
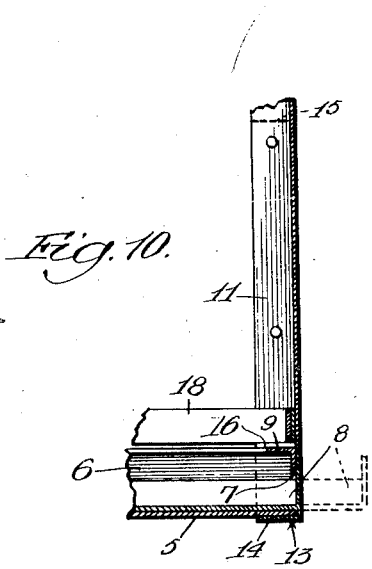
Fig. 10 is a vertical sectional view taken on line 10—10 of Fig. 9.

Each stirrup 13 is preferably in the form of a rigid strip bent to have a flat mid-portion 14 to fit under the bottom of the base 5 and upstanding end portions 15, 15 extending upward at the sides of the base and riveted or otherwise rigidly secured to the side members 11, as shown. The side flange of each member 11 has its lower end turned inward, as at 16, to engage the top flange 9 of the base 5, as shown in Fig. 9. The lower end of the other flange of each member 11 continues downward to engage against the adjacent upright wall of the base and act as a stop to prevent the base from being extended beyond said wall or the latter too far on the base on assembling the two together. These stops on the front wall terminate short of the upper edge of the front wall of the drawer 8 so as not to interfere with the opening or closing of the same, as shown in Fig. 10.

Figure 11:
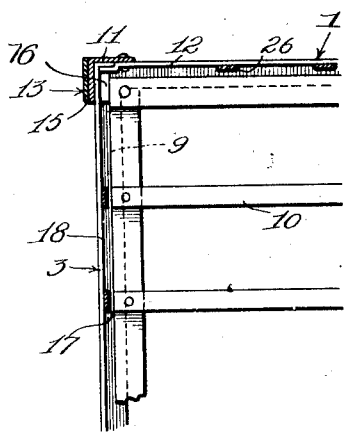
Fig. 11 is a horizontal sectional view taken on line 11—11 of Fig. 9.

Each side wall 3 is composed of a plurality of vertically extending flat wires 17 and cross-members 18, 18, arranged at the center of the wall and at the upper and lower edges thereof, respectively, as shown in Fig. 8. The ends of the cross-members 18 are turned inward to be at right-angles so as to engage in front of the inwardly offset ends of the corresponding cross-members 12, 12 of the front and rear walls 1, 2 of the cage when the parts are set up, as shown in Figs. 5 and 11. The ends of the cross-members 18 extend inside of the angle members 11 and are held thereby against lateral as well as front to rear displacement. The cross-members 18 at the lower edges of these side walls rest on the inturned lower ends 16 of the side members 11 so as to hold the side walls from downward movement. (See Fig. 9.)

The top wall 4 of the cage has angle shaped front and rear members 19, 19 and similarly shaped side members 20, 20. These members are so arranged that their outer flanges extend downward and overlap the outer sides of the front, rear, and side walls of the cage when the top wall is applied thereto, as shown in Fig. 1. The other flanges of these members 19, 20 are horizontal and seat against the upper edges of the upright walls 1, 2 and 3, 3, respectively, of the cage as defined by the cross-members 12 and 18.

Figure 2:
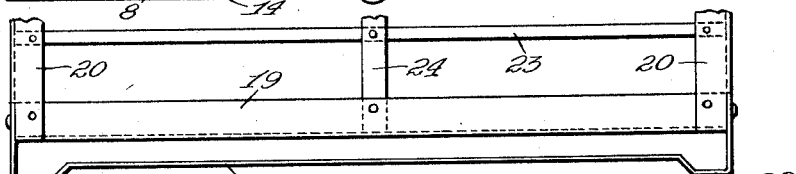
Figs. 2 and 3 are top plan views showing one of the bail like clamps for the top wall in released position; the top wall being omitted in Fig. 3.
Figure 3:
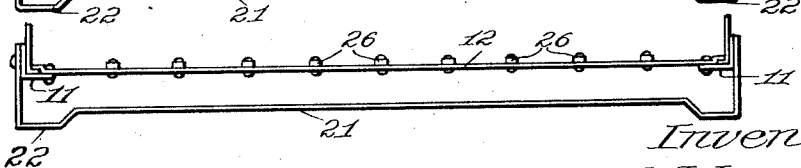

The top wall 4 is clamped against these edges by two bail-like clamps 21, 21 carried at the upper ends of the uprights 11, 11 of the front and rear walls 1, 2 of the cage, as shown in Figs. 1, 2, and 3. The ends of these clamps 21 are pivoted to the side flanges of these uprights on the exterior thereof, and have outwardly offset portions 22, 22 adjacent their opposite ends to clear the top flanges of the members 19, 20 where they are joined together at the corners of the cage, as shown in Figs. 2 and 6. The portion of each clamp between offset portions is flat and snaps over the top flange of the adjacent member 19 when the clamp is swung up over said member for clamping the top wall 4 in place. The depending outside flanges of the side members 20, 20 of the top wall are cut away at their ends so as to clear the uprights 11 and not interfere with the pivoted ends of the clamps 21 as they are swung off of and on to the end members 19, 19 of the top wall, as shown in Fig. 6. The top wall 4 has flat wires 23, 23 extending between and connected with the side members 20, 20 and a centrally disposed cross-member 24 extending between and connected with the end members 19, 19 of said top wall. The wires 23 are also connected with the member 24 where they cross the same. A wire loop handle 25 is connected with said cross-member 24 to facilitate carrying the cage when set up.

The front wall 1 is made up of flat wires 26, 26 extending vertically between and connected with the several cross-members 12, 12. Wire fasteners 27, 27 are carried by the front wall for detachably connecting the seed and water cups (not shown) thereto.

The front wall 1 also has a door 28 hinged at its upper end to one of the cross-members 12 and carrying a wire fastener 29 looped about certain of the flat wires of the door and having its lower ends engaging in a loop 30 carried on the outside of the bottom cross-member 12 below the door, as shown in Fig. 1. The lower ends of this fastener 29 also extend in front of the drawer 8 to hold it from accidentally sliding out of the base 5.

To release the drawer 8, the side portions of the fastener are drawn toward each other to clear the loop 30, whereupon the fastener may be slid up the door to raise the lower ends of the fastener above the drawer. This brings these lower ends within the loop 30, thereby still retaining the door 28 locked in closed position. To release the door so that it may be swung open, the fastener 29 is raised further up the door to release its lower ends from the loop 30.

In having the stirrups 13, 13 engage the under side of the flat base 5 and the lugs 16 engage the top of the base, the latter serve to support the front and rear walls 1, 2 of the cage in their upright positions and constitute the foundation for the cage. In having the side walls 3, 3 in hooked engagement with the front and rear walls, the latter are connected together and are held from slipping off the base. In having the outer flanges of the members 19, 20 of the top overlap the upper ends of the side and front and rear walls on the outside, the side walls are held in locked engagement with said front and rear walls and the upper ends of the latter are held from spreading outward. With the top wall clamped down against the upper edges of the side and the front and rear walls, the several walls and base of the cage are held together in a rigid and strong assembly.

With the several walls and base of the cage releasably connected together, the cage may be readily and easily collapsed and stacked into a compact flat form with the parts laid flatwise one on top of the other for convenient shipping. This is an important feature of my invention, because the manufacturer may ship the cage knocked down or collapsed in containers much smaller and therefore less expensive than containers of a size to take a completely set up cage.

The structure shown and described is simple and effective. All of the attaching parts are carried directly by the cage walls, and therefore can not drop off to become lost in setting up and taking down the cage.

The size of the cage may be varied to suit the size of bird or birds to be housed. Moreover, the details of structure shown and described may be variously changed and modified without departing from the spirit and scope of my invention.

I claim as my invention:

1. A collapsible bird cage having a base and a cage-body, the latter being composed of upright marginal walls and a top wall, certain of the upright marginal walls being releasably connected with and supported by the base, the other of the upright marginal walls being releasably connected with and supported between and in upright position by said first mentioned upright walls, and means for clamping the top wall to the marginal walls, said last named means and the means for releasably connecting the upright walls together and to the base being permanently carried by the respective walls of the cage-body.

2. A collapsible bird cage having a flat rectangular base, and a cage-body, the latter being composed of a top wall and upright marginal walls about the base and extending above the same, two of the opposed marginal walls having stirrups at their lower ends engaging about and under the base so as to have releasable connection with and be supported by said base, and the other two of said walls having releasable connection with and extending between and supported by said first two walls.

3. A collapsible bird cage having a flat rectangular base, upright marginal walls about the base and extending above the same, means permanently carried by said walls for releasably connecting the same together and to the base, respectively, a top wall, and bails pivotally carried by certain of the upright walls and swingable over the top wall to clamp the same against the upper edges of the marginal walls.

4. A collapsible bird cage having a flat rectangular base, and a cage-body, the latter being composed of a top wall and upright marginal walls about the base and extending above the same, two of the opposed upright walls having stirrups and lugs at their lower ends to engage the under and top sides, respectively, of said base for releasably connecting said walls thereto, and the other two of said walls being releasably connected with and extending between and supported by said first two walls.

5. A collapsible bird cage having a flat rectangular base, and a cage-body, the latter being composed of a top wall and upright marginal walls releasably connected together, two of the opposed marginal walls having L-shaped side members and stirrups secured to and extending below said side members to engage about the under side of the base to releasably connect said walls therewith, said side members having stops and lugs at their lower ends, the lugs to engage the top of the base and the stops the exterior of the base in the plane of the respective walls for limiting the extent to which the stirrups may be slipped over the base.

6. In a bird cage, the combination with a flat rectangular base having a drawer opening at its front end, of a drawer slidable into and out of the base through said opening, an upright wall at the front end of said base and having L-shaped side members, a stirrup secured to and extending below said side members to engage about said base for releasably supporting said wall thereon, said side members having their front flanges terminating short of said drawer opening so as not to interfere with the sliding of the drawer through the same.

7. In a bird cage, the combination with connected together upright front, rear, and side walls, of a separable top wall, said top wall having surrounding flanges to overlap the upper portions of said upright walls on the outside thereof, and bails carried by said front and rear walls and pivoted to the sides thereof so as to be swung up over said top wall for clamping the same over the upper edges of said upright walls, the flanges at the sides of the top wall being cut away at the bails to clear the same.

In testimony whereof I affix my signature this 8th day of March, 1927.

LEWICKI J. LEON.